(12) United States Patent
Bodnar et al.

(10) Patent No.: US 6,199,293 B1
(45) Date of Patent: Mar. 13, 2001

(54) MOTORIZED WASHING AND DRYING APPARATUS

(75) Inventors: Paul Bodnar, New Vernon; Rodger Gleason, Chester; Richard J. Macor, Asbury, all of NJ (US)

(73) Assignee: Quick Air, Inc., Asbury, NJ (US)

( * ) Notice: Subject to any disclaimer, the term of this patent is extended or adjusted under 35 U.S.C. 154(b) by 0 days.

(21) Appl. No.: 09/456,065

(22) Filed: Dec. 6, 1999

Related U.S. Application Data

(63) Continuation-in-part of application No. 09/354,431, filed on Jul. 16, 1999.

(51) Int. Cl.$^7$ .................................................. F26B 19/00
(52) U.S. Cl. ................................ 34/61; 34/666; 15/345
(58) Field of Search .......................... 34/271, 272, 60, 34/61, 90, 229, 666; 15/329, 345, 353, 350, 351

(56) References Cited

U.S. PATENT DOCUMENTS

| | | | |
|---|---|---|---|
| 3,638,264 | * | 2/1972 | Walton ................................ 34/243 X |
| 4,836,467 | * | 6/1989 | Rodgers ................................ 15/316.1 |
| 4,872,238 | * | 10/1989 | Crotts et al. ............................ 15/302 |
| 4,880,026 | * | 11/1989 | Ferre et al. ......................... 137/234.6 |
| 5,033,489 | * | 7/1991 | Ferre et al. ......................... 134/57 R |
| 5,208,940 | * | 5/1993 | London et al. ......................... 15/345 |
| 5,930,911 | * | 8/1999 | Alward ................................ 34/666 |
| 5,950,331 | * | 9/1999 | Coggins et al. ......................... 34/666 |

* cited by examiner

Primary Examiner—Stephen Gravini
(74) Attorney, Agent, or Firm—Kenneth P. Glynn, Esq.

(57) ABSTRACT

A mobile, motorized washing and drying apparatus is described which includes a mobile cart or base which is formed for the attachment of both a motorized washing device and a motorized drying device. The motorized washing device is attached to the base and has a motor capable of pressurizing and discharging washing fluids for the washing and cleaning of something, for example, an automobile. The motorized drying device is also attached to the base and has a housing formed with an inlet and an outlet and a motor therein. The motor of the drying device has a shaft with a blade means attached thereto for producing an air flow. The drying device further has a hose extending from it to direct the produced airflow for drying something, for example, a freshly washed automobile. In some embodiments, the motor of the washing device and the motor of the drying device are both electric; and, in other embodiments the motor of the washing device and the motor of the drying device are both internal combustion type.

18 Claims, 2 Drawing Sheets

MOTORIZED WASHING AND DRYING APPARATUS

REFERENCES TO RELATED APPLICATIONS

This application is a continuation-in-part of U.S. patent application Ser. No. 09/354,431, filed on Jul. 16, 1999 by the inventors herein, entitled AIR BLOWER APPARATUS.

FIELD OF THE INVENTION

The present invention relates to a device which can both wash and dry something, for example a freshly washed automobile. More particularly, the present invention relates to a motorized washing and drying system that combines a motorized washing device with a motorized drying device.

BACKGROUND OF THE INVENTION

There are various types of motorized washing devices available which are used or can be used to wash and clean something, including for example, an automobile. These devices generally have an electric or internal combustion type motor to pressurize and discharge cleaning fluids including, for example, water to enhance the washing and cleaning effect. These devices can be large, fixed machines for commercial and industrial applications like car washes, and or, smaller portable, pressure washing machines. Even though these smaller, portable type pressure washing devices can wash something, these machines are not equipped to also dry that which has been washed, for example, a freshly washed automobile.

When considering various known drying devices which belong to a separate field of technology, there are various types of motorized drying devices available which are used or can be used to accelerate drying processes including, for example, the drying of a freshly washed automobile. Generally, these devices are used in commercial type car washes and they are large, fixed motorized air blowing devices. Applicants are not aware of any drying device which is designed small and mobile, and for the drying of a freshly washed automobile. There are, however, smaller motorized air blowing devices which are used to accelerate drying processes for example, a hair dryer. In almost all instances, known drying devices which include various fans and blower units, each have a housing on which a motor is mounted, of which a propeller or blade means is attached, to create and direct an air flow through the housing. Usually the housings serve two basic purposes which are to provide for the attachment of a motor, and, to provide an enclosed airway for the air flow produced by the motor. The housings can be very simple like a short tube, or elaborate like a molded scroll type housing. The motors are usually mounted within the housing and can be small like the motors used in a hair dryer or large like the motors used in commercial car washes. Accordingly, the motors can be powered by electricity or some form of fuel. In virtually all instances the motor of an air blowing device will have a shaft, on which a propeller or "blade means" (any form of propeller or air blade) is attached to produce an air flow through the housing of the device. Generally, if the drying device or air blower produces an air flow which is parallel to the motor shaft, it is considered an axial type fan or air blowing device, and, if the drying device or air blower produces an air flow which is perpendicular to the motor shaft, it is considered a centrifugal type air blowing device.

When contemplating the acceleration of drying processes, for example, drying a freshly washed automobile, applicants have determined through extensive testing and "know how" that the axial or fan type devices usually do not produce sufficient air speed to fully affect the drying process; whereas, centrifugal type air blowing devices tend to more fully affect the drying process by moving large volumes of air at high speeds, however, they are generally too cumbersome and heavy for extended use and manipulation by hand. In addition, the centrifugal type air blowing devices are, by design, very noisy and can be harmful or at least objectionable if operated by hand, close to a user's ears.

Applicants are not aware of any apparatus or machine that currently exists which is relatively small and mobile, and that combines a motorized washing device with a motorized drying device for the purpose of both washing and then drying that which has been washed.

SUMMARY OF THE INVENTION

The present invention involves a motorized washing and drying apparatus which includes a mobile cart or base which is formed for the attachment of both a motorized washing device and a motorized drying device. The motorized washing device is attached to the base and has a motor capable of pressurizing and discharging washing fluids for the washing and cleaning of something, for example, an automobile. The motorized drying device is also attached to the base and has a housing formed with an inlet and an outlet and a motor therein. The motor of the drying device has a shaft with a blade means attached thereto for producing an air flow. The drying device further has a hose extending from it to direct the produced airflow for drying for example, a freshly washed automobile. In some embodiments, the motor of the washing device and the motor of the drying device are both electric; and, in other embodiments the motor of the washing device and the motor of the drying device are both internal combustion type.

Accordingly, it is an important objective of the present invention described herein to provide for a relatively small, mobile apparatus that can both wash then dry that which has been washed.

It is another important objective of the present invention that the present invention be operable with a single energy source, with one embodiment manufactured for use where an electrical source is present, and another embodiment manufactured for use where there is no electrical source.

It is another important objective of the present invention that the drying device produce a high volume, high speed, air flow to effectively accelerate drying processes, with the drying of a freshly washed automobile contemplated.

It is another important objective of the present invention that it be operable by a user over extended periods without discomfort or fatigue.

It is another important objective of the present invention that it be operable by a user over extended periods without hearing discomfort.

It is yet another objective of the present invention that it be commercially viable, simple in design and cost-efficient to manufacture.

DETAILED DESCRIPTION OF THE DRAWINGS

Figure 1:
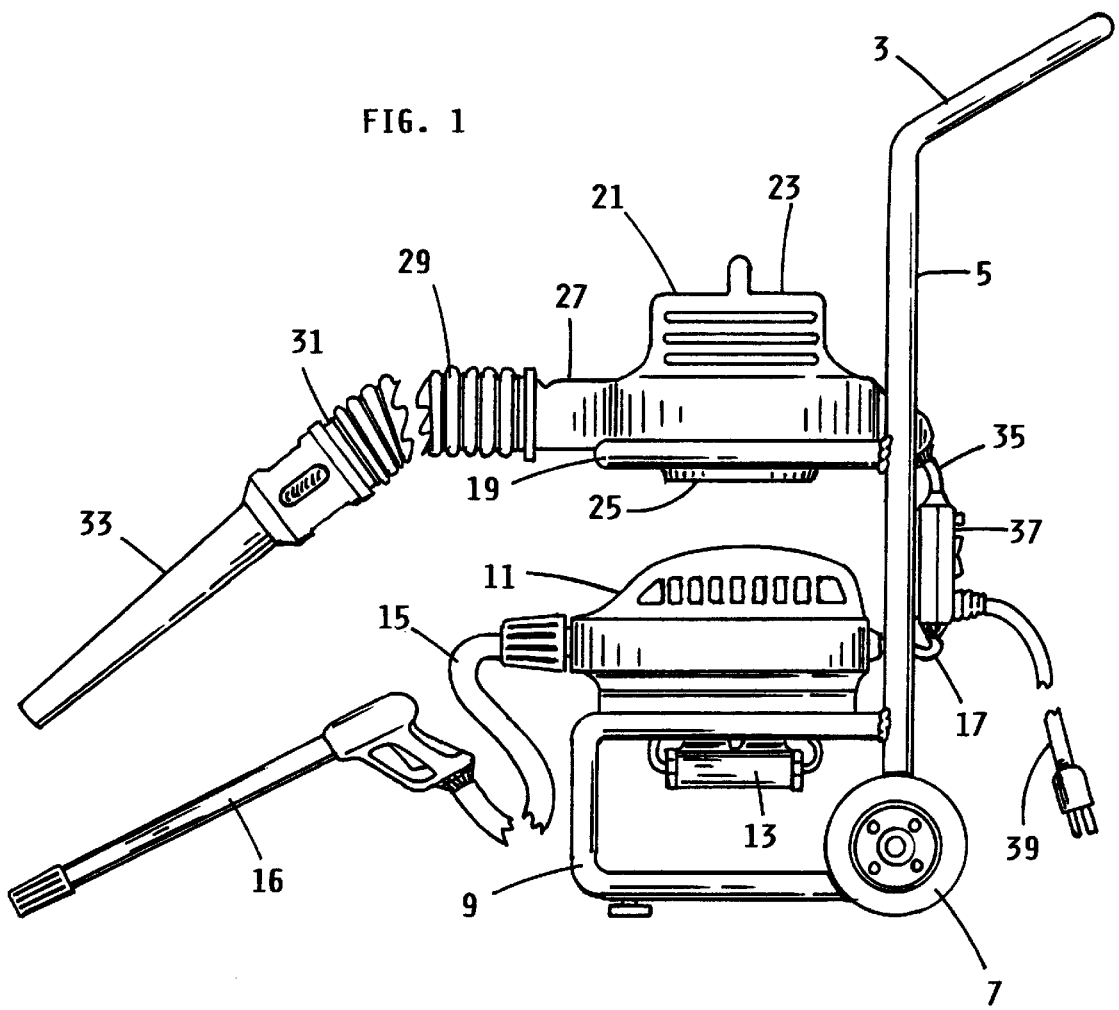
FIG. 1 shows a right side elevation view of one embodiment of the present invention, a motorized washing and drying apparatus that can both wash and dry something, for example, an automobile; and, FIG. 2 shows a right side elevation, cross-section view of the drying device shown in FIG. 1; and, FIG. 3 shows a right side elevation, cross section view of a prior art axial type blower unit.

FIG. 1 shows a right side elevation view of a present invention, motorized washing and drying apparatus 3 which can both wash and dry something, for example, an automobile. There is a cart or base 5 having means for mobility being two wheels, one of which can be seen from this view as wheel 7. Preferred embodiments of the present invention each have a base or cart which is mobile, and therefore, can be pushed or pulled by a user to easily move the motorized washing and drying apparatus around. Base 5 is further formed with brackets 9 and 19 for the attachment of motorized washing device 11 and motorized drying device 21 respectively. Preferred embodiments of the present invention have a base or cart 5 which is formed for the attachment of both a motorized washing device and a motorized drying device. Obviously there could be many ways by which these devices could be attached, and therefore, brackets 9 and 19 are merely an example of many possible attachment methods.

Motorized washing device 11 has a motor therein not seen in this view, which can develop a pressurized discharge of cleaning fluids such as water, or cleaning solutions or any combination thereof. Motorized washing device 11 also has a valve body 13, a discharge hose 15 (shown here in a partial, cut view) and a discharge nozzle 16. The length of discharge hose 15 may be any practical length which provides a user with the ability to easily pressure-wash something, for example an automobile.

Motorized drying device or air blower 21 has housing 23 with a motor inside (not seen in this view) for developing a high volume, high speed airflow. Motorized drying device 21 is a centrifugal type air blower (as defined herein) which can effectively dry that which has been washed. As specified earlier herein, when contemplating the acceleration of drying processes, for example, drying a freshly washed automobile, the axial or fan type air blowing devices usually do not produce sufficient air speed to fully affect the drying process. Through extensive research and testing, applicants have determined that a centrifugal type air blower tends to more fully affect the drying process by producing large volumes of air at high speeds. The high speed airflow tends to physically displace a liquid off of that which is being dried, while the high volume airflow tends to effectively evaporate and atomize the remaining liquid droplets. Although the present invention does not require a centrifugal type blower device, preferred embodiments of the present invention utilize a centrifugal blower device (as defined herein) because the air blower has the performance and features best suited for the preferred application. The housing 23 of motorized drying device 21 also has an inlet 25 and an outlet 27 which is formed for the attachment of a flexible hose 29 (shown in a cut, partial view) which has an end 31 formed for the attachment of a nozzle 33 to direct and control the airflow. The length of the hose 29 may be any practical length which provides a user with the ability to easily dry something, for example a freshly washed automobile. The present invention, motorized washing and drying apparatus shown here also has electrical wiring 17 running from washing device 11 to switch unit 37, and, wiring 35 running from drying device 21 to switch unit 37. Switch unit 37 has wiring or electrical cord 39 (shown in a partial, cut view) which can be connected to an electrical source to provide electrical power to both motorized washing device 11 and motorized drying device 21. Such an arrangement is both practical and efficient because motorized washing and drying apparatus 3 only requires one electrical cord which can then supply power to both motorized washing and drying devices independently or simultaneously via a main switch. For example, motorized washing and drying device 3 could be used to both wash and dry vehicles at new and used car dealerships, auto body and service shops, motorcycle shops etc. or where ever there is an electrical source with at least one outlet. Alternatively, there could also be a motorized washing and drying apparatus similar to that shown in this view but with both motors driven by some form of fuel so that the system or apparatus could be used out in the field where there was no electrical source. If the motor of the washing device was an internal combustion type; and, the motor of the drying device was an internal combustion type, this would also be a practical and efficient preferred embodiment of the present invention.

Figure 2:
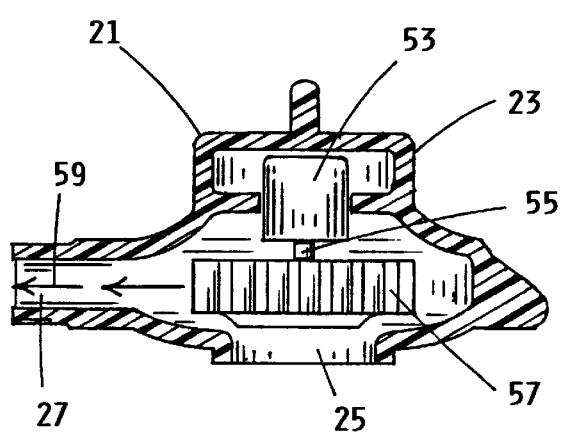

FIG. 2 shows a right side elevation, cross-section view of the centrifugal blower unit 21 shown in FIG. 1, wherein blower unit 21 has housing 23 with inlet 25 and outlet 27. Positioned and secured within housing 23 is motor 53 which has motor shaft 55. Blower unit 21 is positioned the same as in FIG. 1 with the motor shaft 55 perpendicular or about perpendicular to the ground. The present invention does not require that blower unit 23 be positioned such that the shaft is substantially perpendicular to ground level, however, preferred embodiments have the blower unit positioned this way to maximize the working life of any bearings that may be associated with motor 53 or motor shaft 55. Attached to motor shaft 55 is blade means 57 which when spun by motor 53 produces an airflow 59 through housing 23, relative to shaft 55. The air flow 59 produced by blade means 57 is substantially perpendicular to motor shaft 55. Generally, all the motors of fans and air blower devices have a motor shaft, on which a propeller or "blade means" (any form of propeller or air blade) is attached to produce an air flow through the housing of the device. If the motor and blade means produce an air flow which is perpendicular to the motor shaft as shown in FIG. 2, it is considered a centrifugal type air blowing device; and, if the motor and blade means produce an air flow which is parallel to the motor shaft as shown in FIG. 3, it is considered an axial type fan or air blowing device.

As specified earlier herein, it is an important objective of the present invention described herein to include a motorized, drying device which can produce a high volume, high speed, air flow to effectively accelerate drying processes, with the drying of a freshly washed automobile contemplated. It is another important objective of the present invention that it be operable by a user over extended periods without discomfort or fatigue, and that it further be operable by a user over extended periods without hearing discomfort. The present invention is the result of the combined objectives, wherein, the drying device is a centrifugal type air blower producing a high speed, high volume air flow whereas the high speed air flow tends to physically displace a liquid off of that which is being dried, while the high volume airflow tends to effectively evaporate and atomize the remaining liquid droplets. Also, if the motors of both the washing device and the drying device are attached to a mobile cart or base, the user does not need to handle and manipulate the heavy blower unit or heavy washing device, only the attached hoses and nozzles which are lightweight and easy to handle over extended periods. Another benefit of such an arrangement is that the user's ears are somewhat isolated from the noisy motors of both washing and drying devices which rest on a base or cart, a short, none the less, remote distance away from the user.

Figure 3:
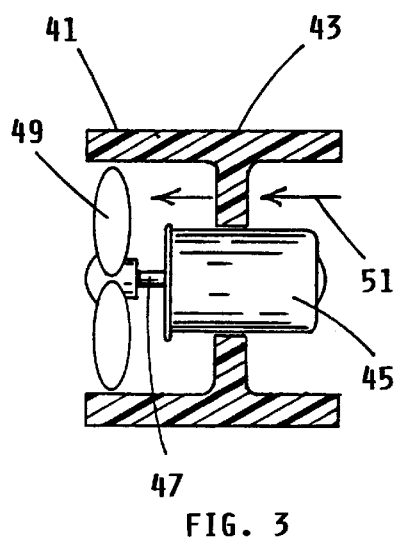

FIG. 3 shows a right side elevation, cross section view of a prior art axial type blower unit, wherein there is fan or blower unit 41 with housing 43. Housing 43 has motor 45 mounted therein. Motor 45 has motor shaft 47 on which blade means 49 is attached to produce air flow 51 which is substantially parallel to motor shaft 47. In this figure blade means 49 is simply a propeller. As earlier noted, the axial or fan type air blowing devices usually do not produce sufficient air speed to fully affect the drying process, and therefore, they are not preferred for the intended application.

Upon reading and understanding the specification of the present invention described above, modifications and alterations will become apparent to those skilled in the art. It is intended that all such modifications and alterations be included insofar as they come within the scope of the patent as claimed or the equivalence thereof.

What is claimed is:

1. An independent, motorized washing and drying apparatus comprising:
    a base being formed for the attachment of both a motorized washing device and a motorized drying device, said base having means for mobility being at least two wheels; and,
    a motorized washing device attached to said base having a motor capable of pressurizing and discharging washing fluids through a hose being substantially flexible and long thereby requiring handling by a user to direct the discharge of said washing fluids; and,
    a motorized drying device attached to said base, said drying device having a housing formed with an inlet and an outlet, and a motor therein having a shaft with blade means attached thereto for producing an air flow through a hose being substantially flexible and long thereby requiring handling by a user to direct said produced airflow.

2. A motorized washing and drying apparatus of claim 1 wherein said motorized drying device produces an airflow which is substantially perpendicular to said motor shaft.

3. A motorized washing and drying apparatus of claim 1 wherein the motor of said washing device is an electric type, and the motor of said drying device is an electric type.

4. A motorized washing and drying apparatus of claim 1 wherein the motor of said washing device is an internal combustion type and the motor of said drying device is an internal combustion type.

5. A motorized washing and drying apparatus of claim 2 wherein the motor of said washing device is an electric type, and the motor of said drying device is an electric type.

6. A motorized washing and drying apparatus of claim 2 wherein the motor of said washing device is an internal combustion type and the motor of said drying device is an internal combustion type.

7. A motorized washing and drying apparatus of claim 3 wherein there is a single electrical cord which may supply electricity to both said washing and drying motors.

8. An independent, motorized washing and drying apparatus comprising:
    a base being formed for the attachment of both a motorized washing device and a motorized drying device, said base having means for mobility being at least two wheels; and,
    a motorized washing device attached to said base having a motor capable of pressurizing and discharging washing fluids through a hose being substantially flexible and long thereby requiring handling by a user to direct the discharge of said washing fluids; and,
    a motorized drying device attached to said base, said drying device having a housing formed with an inlet and an outlet, and a motor therein having a shaft with blade means attached thereto for producing an air flow substantially perpendicular to said motor shaft, then through a hose being substantially flexible and long thereby requiring handling by a user to direct said produced airflow.

9. A motorized washing and drying apparatus of claim 8 wherein the hose of said drying device is formed for the attachment of an attachable nozzle to one end thereof.

10. A motorized washing and drying apparatus of claim 8 wherein the motor of said washing device is an electric type, and the motor of said drying device is an electric type.

11. A motorized washing and drying apparatus of claim 8 wherein the motor of said washing device is an internal combustion type and the motor of said drying device is an internal combustion type.

12. A motorized washing and drying apparatus of claim 9 wherein the motor of said washing device is an electric type, and the motor of said drying device is an electric type.

13. A motorized washing and drying apparatus of claim 9 wherein the motor of said washing device is an internal combustion type and the motor of said drying device is an internal combustion type.

14. A motorized washing and drying apparatus of claim 10 wherein there is a single electrical cord which may supply electricity to both said washing and drying motors.

15. An independent, motorized washing and drying apparatus comprising:
    a base being formed for the attachment of both a motorized washing device and a motorized drying device, said base having means for mobility being at least two wheels; and,
    a motorized washing device attached to said base having a motor capable of pressurizing and discharging washing fluids through a hose being substantially flexible and long thereby requiring handling by a user to direct the discharge of said washing fluids; and,
    a motorized drying device attached to said base, said drying device having a housing formed with an inlet and an outlet, and a motor therein having a shaft with blade means attached thereto for producing an air flow substantially perpendicular to said motor shaft, then through a hose being substantially flexible and long thereby requiring handling by a user to direct said produced airflow, and further wherein one end of said hose is adapted for the attachment of a nozzle.

16. A motorized washing and drying apparatus of claim 13 wherein the motor of said washing device is an electric type, and the motor of said drying device is an electric type.

17. A motorized washing and drying apparatus of claim 13 wherein the motor of said washing device is an internal combustion type and the motor of said drying device is an internal combustion type.

18. A motorized washing and drying apparatus of claim 16 wherein there is a single electrical cord which may supply electricity to both said washing and drying motors.

* * * * *